July 30, 1968  R. B. BOSSLER, JR  3,394,972

JOURNAL BEARING

Filed May 21, 1965

INVENTOR.
ROBERT B. BOSSLER, JR.
BY
McCormick, Paulding & Huber
ATTORNEYS

United States Patent Office 3,394,972
Patented July 30, 1968

3,394,972
JOURNAL BEARING
Robert B. Bossler, Jr., Bloomfield, Conn., assignor to Kaman Corporation, a corporation of Connecticut
Filed May 21, 1965, Ser. No. 457,564
11 Claims. (Cl. 308—122)

ABSTRACT OF THE DISCLOSURE

A journal bearing consists of a journal member having a number of lobes. These lobes are surrounded by a flexible sleeve fixed to the bearing member and having an internal circumference of a length less than the circle containing the lobe peaks. The lobes therefore deform the sleeve. Upon rotation of the journal member lubricant supplied to the gaps between adjacent lobes is wedged between the sleeve and the journal member and tends to further deform the sleeve and to create a uniform thickness lubricant film around the journal member.

---

This invention relates to journal bearings, and deals more particularly with improvements in journal bearings using foil bearing principles.

As used herein, a foil bearing is one in which a flexible foil is stretched around a portion of the circumference of a journal and in which a suitable lubricant film is maintained between the journal and foil by the hydrodynamic action resulting from rotation of the journal. The structure and performance of such a bearing is described in Blok and Van Rossum, The Foil Bearing—A New Departure in Hydrodynamic Lubrication, Lubrication Engineering, December 1953, pp. 316 to 320, to which reference is made for a more complete understanding. A major disadvantage of foil bearings as heretofore proposed, however, is their ability to react radial loads in one direction only.

The general object of this invention is to provide a journal bearing suitable for use in special applications and environments in which other more conventional journal bearings are unsuited.

A more particular object of this invention is to provide a journal bearing capable of performing satisfactorily at high temperatures and over a wide temperature range without the dimensional changes caused by thermal expansion and contraction having a detrimental or destructive effect on the bearing.

Another object of the invention is to provide a journal bearing particularly well suited for use in conjunction with a high speed shaft or journal under relatively low load conditions, as for example for inhibiting or suppressing shaft whirl.

A further object of this invention is to provide a journal bearing which operates hydrodynamically much like a simple foil bearing and which is capable of reacting radial loads occurring in any direction.

Still another object of this invention is to provide a journal bearing which is more reliable than conventional bearings and which adjusts itself automatically to a wide range of changes in shaft speed, lubricant viscosity, load, lubricant supply and thermal dimensional changes without allowing contacts between the two relatively moving surfaces.

Other objects and advantages of the invention will be apparent from the following description and from the drawings forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Figure 1:
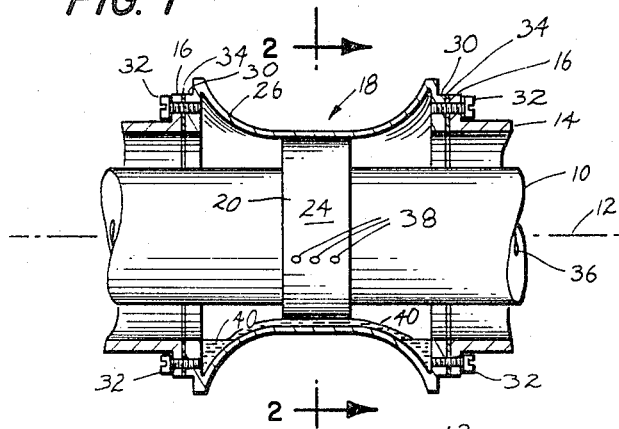
FIG. 1 is a longitudinal cross sectional view taken through a journal bearing embodying the present invention.
Figure 2:
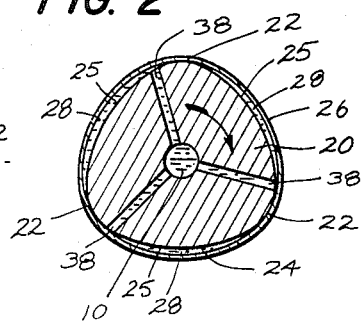
FIG. 2 is a transverse cross sectional view taken on the line 2—2 of FIG. 1.

Turning now to the drawings and first considering FIGS. 1 and 2, these figures illustrate a journal bearing embodying the present invention as used to rotatably support one member for rotation relative to another member about an axis generally fixed relative to both of the members. In these figures, the rotatable member is illustrated as being a shaft 10 which is rotatable about its central axis 12 relative to stationary structure in the form of two hollow housing parts 14, 14. Each of the housing parts 14 includes a circumferentially and radially extending flange 16, and the two flanges 16, 16 are axially spaced from one another to receive therebetween the bearing of the present invention which is illustrated generally at 18. By way of example, the shaft 10 may be taken to be a relatively long shaft supported at both of its ends by other bearings and rotated at a relatively high speed about its central axis 12, and the bearing 18 may be taken as serving to exert radial restraint on the shaft to prevent or inhibit whirling of the shaft as the critical shaft speed is reached.

Considering the bearing 18 of FIGS. 1 and 2 in more detail, this bearing comprises a journal 20 fixed to the shaft 10 and including a multiplicity of circumferentially distributed lobes. The number of lobes may vary but preferably at least three or more equally angularly spaced lobes are provided to achieve polar isotropy. The journal 20 has a substantial axial extent so as to define a fairly wide circumferentially extending bearing surface 24, which in the illustrated case is generated by a line moved parallel to the central axis 12 so as to be straight or flat in the axial direction. As shown best in FIG. 2, the illustrated journal 20 includes three lobes with the lobes having peaks at the points indicated at 22, 22 at which the bearing surface 24 is spaced a maximum distance from the central axis. Between the lobe peaks 22, 22, the bearing surface 24 defines "flats" 25, 25 along which it is spaced from the central axis by a distance less than said maximum distance, and although the areas 25, 25 are referred to as "flats" it will be understood that they are not actually flat or straight in shape but slightly curved as shown in FIG. 2 so that the bearing surface 24 has a smooth continuous curvature in transverse cross section with a small radius of curvature at the lobe peaks 22, 22 and a larger radius of curvature at the flats 25, 25. The maximum points or peaks 22, 22 are all located on a common circle concentric with the central axis and the minimum points of the flats 25, 25 are likewise all located on another common circle concentric with the central axis.

Surrounding the journal 20 of the bearing 18 is a very thin-walled sleeve 26 made of metal or other material capable of being elastically deformed, without any substantial stretching or elongation, by the lobes of the journal 20. In the region of the journal 20, the sleeve 26 is axially straight similar to the bearing surface 24 so as to extend parallel thereto. Also in the region of the journal, the sleeve 26 is of such a diameter in its undeformed state that when assembled with the journal as illustrated, the lobes of the journal deform the sleeve into a non-circular shape with the sleeve passing over the peaks 22, 22 of the lobes and with the sleeve being spaced from the journal surface 24 between each pair of adjacent lobe peaks to provide a number of gaps 28, 28 between the sleeve and the journal surface 24. As a result, the sleeve 26 is spring loaded against or toward the journal at the lobe peaks.

The shape of the sleeve 26 must be such as to allow it in the region of the journal 20 to deform from a right cylinder with a circular directrix to a right cylinder with a non-circular directrix as the journal rotates. Various different shapes of sleeves may be used to achieve this flexing. In the illustrated case, for example, the sleeve is shown to have a shape, on each side of the journal 20, approximately equivalent to one half of an hyperboloid of one sheet closed by a flange 30 which is fixed to the flange 16 of the associated stationary housing part 14 by a number of screws, such as shown at 32, passing through the flange 16 and threaded into the flange 30, a gasket 34 preferably being provided between each flange 16 and its associated flange 30, as illustrated in FIG. 1. The sleeve 26 could also, for example, have the approximate shape of a full hyperboloid of one sheet closed by flanges similar to the flanges 30, 30 at each end.

In addition to the above described journal and sleeve, the bearing 18 further includes means for introducing lubricant into the gaps 28, 28 formed between the journal bearing surface 24 and the sleeve 26. In the illustrated bearing, this lubricant supply means comprises an axially extending lubricant supply passageway 36 passing through the shaft 10 and supplied with lubricant from a suitable source. Communicating with this passageway 10 are a number of radial passageways 38, 38 which pass through the journal 20 and provide communication between the passageway 36 and the journal bearing surface 24. As shown best in FIG. 1, the illustrated bearing includes three such passageways 38, 38 for each lobe of the journal, with the three passageways 38, 38 of each lobe having their mouths spaced axially in a straight line along the length of the bearing surface 24 and being spaced some distance behind the associated lobe peak 22 with respect to the direction of rotation of the journal as shown by the arrow in FIG. 2.

As the journal and shaft rotate, lubricant from the central passageway 36 is moved by centrifugal force through the radial passageways 38, 38 to the gaps 28, 28, and preferably the number and size of the passageways 38, 38 is such that an oversupply of lubricant is supplied to the gaps. The rotation of the shaft and journal traps lubricant into converging wedges between the bearing surface 24 and the sleeve 26. During operation these wedges tend to produce a constant film thickness between the journal and the sleeve in the vicinities of the lobe peaks 22, 22 in a manner similar to that in which a constant film thickness is produced in a conventional foil bearing. The result is, therefore, a bearing which has the constant film thickness and other advantages of a conventional foil bearing and which is nevertheless capable of reacting radial loads in all directions, the bearing being capable of reacting radial loads passing through any of the lobe peaks. The action of the bearing in producing a constant film thickness can be appreciated by noting that as a lubricant film begins to appear between the journal surface 24 and the sleeve 26 in the vicinity of the lobe peaks 22, 22, the circumference of the sleeve will remain essentially constant since the sleeve does not stretch or elongate any substantial amount. Therefore, the gaps 28, 28 must decrease in radial thickness to provide clearance for the lubricant film at the lobe peaks. The equilibrium conditions therefore requires that the converging wedge surfaces can approach parallelism but cannot become divergent surfaces.

Excess lubricant 40 which flows from the journal 20 of the bearing 18 collects in the lower portion of the sleeve 26 and is removed therefrom in any suitable manner as by permitting it to flow along the bottom portions of the housing parts 14, 14 to a suitable sump or drain.

The bearing 18 of FIGS. 1 and 2 is particularly well adapted for reacting relatively light radial loads. If it is desired to react greater radial loads, the bearing may include additional structure providing a reaction surface surrounding the sleeve 26 in the region of the journal 20. Such a bearing is shown, for example, at 42 in FIGS. 3 and 4. Parts of the bearing 42 which are similar to the bearing 18 have been given the same reference numbers as the parts of the bearing 18 and need not be redescribed.

Figure 3:
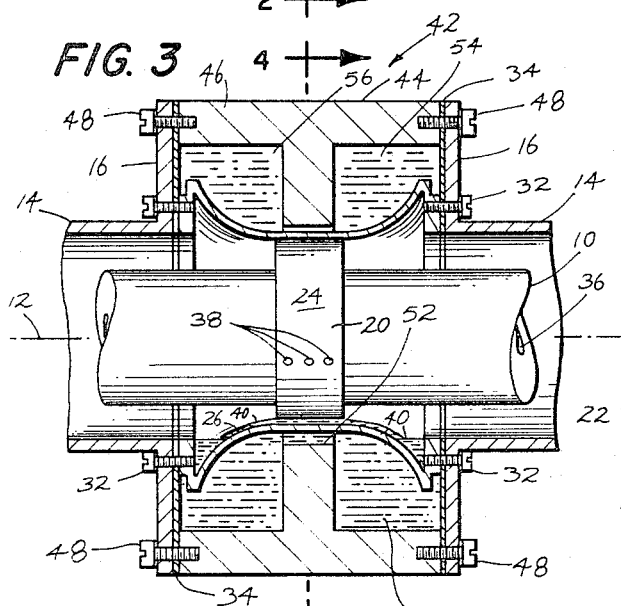
FIG. 3 is a longitudinal cross sectional view taken through a journal bearing comprising another embodiment of the present invention.
Figure 4:
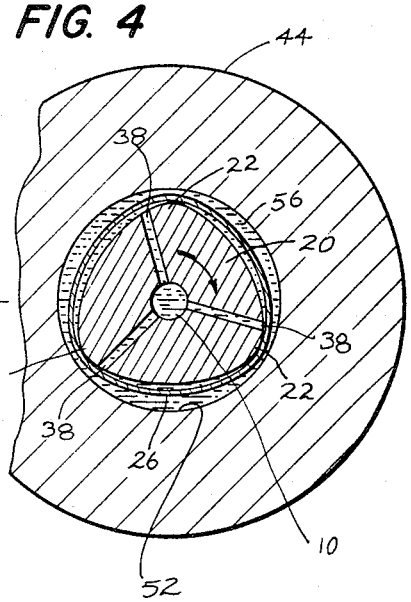
FIG. 4 is a transverse sectional view taken on the line 4—4 of FIG. 3.

Referring to FIGS. 3 and 4, it will be noted that the bearing 42 in addition to the parts included in the bearing 18 of FIGS. 1 and 2 includes a ring 44, preferably made in two half sections, which surrounds the sleeve 26. The ring 44 has an axially extending cylindrical portion 46 which is fixed to the flanges 16, 16 of the stationary housing parts 14, 14 by a number of screws 48, 48 passing through the sleeve 16 and threaded into the cylindrical portion 46. Extending inwardly from the cylindrical portion 46 of the ring member is an annular radial portion 50 defining an inwardly facing reaction surface 52. The latter surface 52 is cylindrical in shape, is arranged generally concentric with the central axis 12 of the shaft 10 and has an axial length approximately equal to the axial length of the journal bearing surface 24.

As shown best in FIG. 4, the reaction surface 52 is of such a diameter as to be very closely spaced to the outer surface of the sleeve 26 when the sleeve 26 is in direct engagement with the journal surface 24 as during non-rotation of the shaft 10. The diameter of the reaction surface 52 is further such that as the shaft 10 is rotated, and a lubricant film thereby built up between the journal surface 24 and the sleeve 26, the sleeve 26, in the vicinity of the lobe peaks 22, 22 engages or at least very nearly engages the reaction surface 52. The transmission of radial loads between the sleeve 26 and the reaction surface 52 may be accomplished by either a direct engagement between the sleeve 26 and the reaction surface 52 or by the interposition of a lubricant film between the sleeve and the reaction surface.

In the bearing 42 illustrated in FIGS. 3 and 4, the construction is such that the reaction surface 52 is separated from the sleeve 26 by a lubricant film. In referring to these figures, it will be noted that the construction of the ring member 46 and other parts of the illustrated structure is such that a chamber 54 is provided which encloses both the reaction surface 52 and the entire outer surface of the sleeve 26 including that portion thereof located in the axial region of the journal 20. This chamber 24 is completely filled with a trapped lubricant 56. As the shaft 10 and the journal 20 are rotated, this trapped lubricant 56 forms a thin film between the outer surface of the sleeve 26 and the reaction surface 52 so that the reaction surface does not bear directly against the sleeve.

Figure 5:
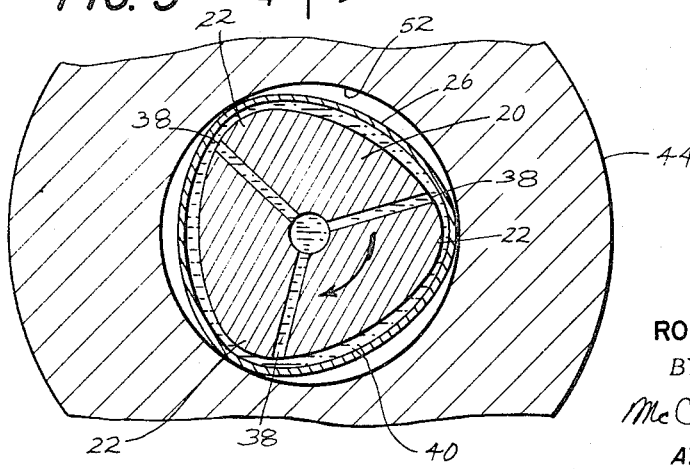
FIG. 5 is generally similar to FIG. 4, but shows a slightly modified form of bearing embodying the present invention.

In other situations it may be desirable to omit the lubricant 56 and to permit the sleeve 26 to bear directly against the reaction surface 52. Such a construction is shown in FIG. 5. This figure is similar to FIG. 4 but shows the bearing 42 in operation without a trapped lubricant between the sleeve and the reaction surface. It should also be noted that in this case the reaction surface 54 is definitely of such a diameter that as a lubricant film is built up between the lobe peaks 22, 22 of the journal and the sleeve 26, the outer surface of the sleeve 26 is brought into engagement with the reaction surface 54. With regard to the engagement between the reaction surface 54 and the sleeve 26, it should further be noted that as the journal 20 rotates the sleeve remains angularly fixed relative to the reaction surface and little or no sliding motion takes place therebetween so as to reduce or eliminate the need for lubricant of any sort.

The invention claimed is:

1. In a journal bearing for rotatably supporting a first member relative to a second member for rotation about a central axis generally fixed relative to both of said members, the combination comprising first and second members such as aforesaid, a journal on said first member extending some distance axially thereof and including a plurality of angularly spaced lobes each having a peak, a flexible sleeve surrounding said journal which sleeve is fixed to said second member and which sleeve in the region of said journal is of such circumferential length as to be deformed by said journal at the peaks of said lobes and as to be spaced a substantial distance from said journal between adjacent lobes to produce gaps between said journal and said flexible member, and means for introducing lubricant into said gaps as said first member is rotated relative to said second member.

2. The combination defined in claim 1 further characterized by said lobe peaks of said journal being located on a common circle and the surface of said journal between each pair of adjacent lobe peaks having a minimum point at which it is spaced a minimum distance from said central axis, all of said minimum points being located on another common circle, and said sleeve in the region of said journal having an internal circumference intermediate the circumferences of said circles on which said lobe peaks and minimum points are respectively located.

3. The combination defined in claim 1 further characterized by means defining a recreation surface fixed relative to said second member and surrounding said sleeve in the region of said journal, said reaction surface being a surface of revolution generally concentric with said central axis and of such a size as to be located closely adjacent to the outer surface of said sleeve at the portions thereof overlying said lobe peaks.

4. The combination defined in claim 3 further characterized by means defining a chamber enclosing said reaction surface and the portion of said sleeve surrounded thereby, and a trapped liquid completely filling said chamber.

5. The combination defined in claim 1 further characterized by said journal including at least three equally angularly spaced lobes.

6. The combination defined in claim 1 further characterized by said means for introducing lubricant into said gaps including an axial lubricant supply passageway in said first member and a plurality of radial lubricant supply passageways in said journal providing communication between said axial passageway and said gaps.

7. In a journal bearing, the combination comprising a journal supported for rotation about a central axis and having a circumferentially extending bearing surface which in transverse cross section is of such a shape as to include a plurality of angularly spaced lobes providing said bearing surface with a plurality of lobe peaks at which said surface is spaced a maximum distance from said central axis and a plurality of flats located between adjacent pairs of said lobe peaks and along which flats said bearing surface is spaced by a distance less than said maximum distance from said central axis, a flexible sleeve surrounding said journal and having a part thereof fixed relative to said central axis, said sleeve in the region of said journal having a portion which is deformed radially outwardly by said peaks of said bearing surface lobes and which is radially spaced from said bearing surface flats to produce gaps between said bearing surface and said flexible member, and means for introducing lubricant into said gaps as said journal is rotated relative to said sleeve.

8. In a journal bearing, the combination as defined in claim 7 further characterized by said bearing surface of said journal being a surface generated by a line parallel to said central axis.

9. In a journal bearing, the combination as defined in claim 7 further characterized by means providing an inwardly facing reaction surface fixed relative to said central axis and surrounding said sleeve in the region of said journal.

10. In a journal bearing, the combination as defined in claim 9 further characterized by said reaction surface having such a diameter as to be out of engagement with said sleeve when said journal is stationary relative to said sleeve and as to be engaged by said sleeve at said lobe peaks when said journal is rotated at a sufficient speed to produce an oil film between said sleeve and said lobe peaks.

11. In a journal bearing, the combination as defined in claim 10 further characterized by means providing a lubricant trapped between said sleeve and said reaction surface.

References Cited

UNITED STATES PATENTS

| 2,322,004 | 6/1943 | Fast | 308—72 |
| 3,215,480 | 11/1965 | Marley | 308—121 |
| 3,215,479 | 11/1965 | Silver et al. | 308—121 |

FOREIGN PATENTS

| 514,555 | 11/1920 | France. |
| 996,515 | 10/1951 | France. |
| 1,355,328 | 2/1964 | France. |
| 380,660 | 9/1932 | Great Britain. |

MARTIN P. SCHWADRON, *Primary Examiner.*

FRANK SUSKO, *Assistant Examiner.*